United States Patent [19]
Land et al.

[11] Patent Number: 5,035,852
[45] Date of Patent: Jul. 30, 1991

[54] TAPERED LEAF SUPPORT PIN FOR OPERATING PLANT GUIDE TUBES

[75] Inventors: John T. Land; Ronald J. Hopkins, both of Pensacola; Daniel E. Ford, Cantonment, all of Fla.

[73] Assignee: Westinghouse Electric Corp., Pittsburgh, Pa.

[21] Appl. No.: 376,771

[22] Filed: Jul. 7, 1989

[51] Int. Cl.[5] .............................................. G21C 7/00
[52] U.S. Cl. .................................... 376/353; 411/283; 411/508; 411/937.2
[58] Field of Search ............... 376/353, 449, 463, 446; 24/297; 411/2, 3, 5, 283, 508, 509, 510, 537, 913, 937, 937.2; 403/259, 406.1, 408.1

[56] References Cited

U.S. PATENT DOCUMENTS

| | | | |
|---|---|---|---|
| 3,749,362 | 7/1973 | O'Connor et al. | 411/537 |
| 3,915,056 | 10/1975 | Johnson | 411/537 |
| 4,069,102 | 1/1978 | Berringer et al. | 376/463 |
| 4,729,606 | 3/1988 | Narita et al. | 24/297 |
| 4,768,704 | 9/1988 | Beckway et al. | 24/297 |
| 4,770,846 | 9/1988 | Land et al. | 376/353 |
| 4,772,448 | 9/1988 | Popalis et al. | 376/353 |
| 4,937,039 | 6/1990 | Balog et al. | 376/353 |

Primary Examiner—Daniel D. Wasil

[57] ABSTRACT

A mounting system for removably mounting the lower flange of a control rod guide tube over an opening in the upper core plate of a nuclear reactor includes support pins having first and second pin portions. The first pin portion passes through the guide tube flange and has an externally threaded section. The second pin portion is secured within the bore of the upper core plate and has a solid body section and a split-leaf section. The solid body section has an outer diameter which is accommodated in the bore by a close clearance fit. The split-leaf section has a split intermediate section and a split end section. The split intermediate section extends from the solid body section, has an outer diameter which is less than the outer diameter of the solid body section, and tapers uniformly between the solid body section and the split end section to form a conical shape. The split end section biasingly engages at least a portion of the bore wall. A locking nut threadedly engages an externally threaded section of the first pin portion. A washer is disposed around the first pin portion between the locking nut and the control rod guide tube flange and includes a concave spherical upper surface which is shiftable during mounting of the locking nut to compensate for nonperpendicular alignment between the support pin and the control rod guide tube flange.

22 Claims, 2 Drawing Sheets 5,035,852

TAPERED LEAF SUPPORT PIN FOR OPERATING PLANT GUIDE TUBES

TECHNICAL FIELD

The present invention relates to a mechanical support pin system for the control rod guide tubes of nuclear reactor power plants. More particularly, the present invention relates to a pin system for mounting the control rod guide tubes to the upper core plate of a nuclear reactor using non-welded mechanical pins having a split-leaf base section with tapered leaves.

BACKGROUND OF THE INVENTION

Within a nuclear reactor, the upper boundary of the reactor core is defined by the upper core plate. The upper ends of the nuclear fuel assemblies that heat the water circulating through the core are detachably engaged the undersurface of the upper core plate. Each fuel assembly includes an array of spaced-apart fuel rods within which nuclear fuel pellets are disposed. Each fuel assembly further has a plurality of tubes disposed between the fuel rods that receive neutron-absorbing nuclear reactor control rods for controlling the power output of the fuel assemblies and the reactor core. Reciprocal movement of the nuclear reactor control rods within these tubes is implemented by control rod drive mechanisms (CRDM's) through drive rods that extend through the pressure vessel.

Such nuclear reactors further include an upper support plate that is vertically spaced above the upper core plate. An upper plenum chamber is defined between the upper support plate and the upper core plate. Reciprocal movement of the nuclear reactor control rods occurs within the upper plenum chamber where the drive rods are connected to the upper end of the control rods. In this plenum chamber, the control rods and their respective drive rods are slidably received within guide tubes which are interposed-between, and connected to, the upper surface of the upper core plate and the upper support plate. These guide tubes properly align the control rods with their respective fuel assemblies, and also serve to prevent control rods and drive rods from laterally vibrating from cross-currents present in the surrounding, rapidly circulating coolant. Annular flanges are provided at the lower ends of the guide tubes as part of a mechanism for securing them to the upper core plate.

Guide tube retaining pins mount the guide tube flanges around an opening in the upper core plate. These pins are vertically disposed, and have lower portions called leaves which are laterally resilient and frictionally engageable within suitable bores present in the upper core plate. The upper portion of each pin is inserted into holes in the guide tube lower flange to form an interference fit and is subsequently locked in place onto the flange with a locking system comprising two small welds.

The purpose of such guide tube retaining pins is to mount the nuclear reactor control rod guide tubes within the upper core plate in such a way that lateral, vibrating motion is resisted while vertical movement caused by differential thermal expansion is tolerated. However, in some reactors, bending stresses caused by, for example, a non-perpendicular orientation between the pins and the guide tube flange may cause stress corrosion cracking problems to develop within the retaining pins and weaken them to a point where they must be repaired or replaced by a welding operation. Because the retaining pin and system which locks it in place on the guide tube flange are located within operating plants in an irradiated, underwater environment, the welding operations are difficult to achieve. The small size of the retaining pin and locking system, and the confined area within which the welding operations must be performed contribute to this difficulty. Furthermore, the heat generated by the welding operation itself causes other difficulties to arise, such as the sensitization of structural material adjacent to the welded area to stress corrosion cracking. Finally, even remotely operated underwater welding operations can expose workers to potentially dangerous radiation.

A dual crimp locking system is disclosed in commonly-assigned U.S. Pat. No. 4,770,846 to Land, Hopkins, and Martinez, the disclosure of which is incorporated by reference. The '846 patent discloses a support pin having a split-leaf base section, an externally threaded, upper bolt portion, and a top end portion provided with vertical grooves. The grooved top end protrudes through a securing nut threaded onto the upper bolt portion. The nut is provided with vertical splines and the locking system is secured by a stepped tubular cap which is crimped into place around both the top end portion of the support pin and the securing nut to positively prevent retrograde rotation between the support pin and nut. This fastening arrangement depends for its efficacy on the structural integrity of the crimped cap, i.e., the stepped tubular cap, as well as that of the support pin. However, the structural configuration of these support pins subjects them to stresses which may promote cracking.

If the retaining pin and locking system should fail, the longevity of the nuclear reactor as a whole may be seriously compromised by the resulting dislodged parts that would be propelled through the system by the swiftly flowing coolant. These dislodged parts may damage other power plant components, such as the heat exchanger tubes in the steam generators. If the shanks of prior art support pins should fail from stress corrosion cracking, the upper bolt portion of the support pin, along with the attached nut or crimped cap, may subsequently dislodge under the influence of the coolant flow.

These concerns were addressed in the commonly assigned U.S. Pat. No. 4,772,448 to Popalis, Hopkins, Land, and Obermeyer, the disclosure of which is also incorporated by reference. The '448 patent provides a mechanical support pin system using a split leaf support pin to mount the control rod guide tubes to the upper core plate. The support pin has a first pin portion that is insertable through a bore in the guide tube flange, and a second pin portion fixedly secured within the bore and having a solid body section and a split-leaf base section. The solid body section has an outer diameter that is accommodated in the bore by a close clearance fit, and the split-leaf base section has a split intermediate section and a split-end section. The split intermediate section extends from the solid body section and has an outer diameter that is smaller than the outer diameter of the solid body section. The split end section extends from the split intermediate section and biasingly engages at least a portion of the wall of the bore. The support pin is secured within the second structural member by a frictional fit and loads applied transversely to the longitudinal axis of the support pin are reacted substantially in pure shear by the second pin portion substantially through the solid body section. A locking nut threadedly engages an externally threaded section of the first pin portion and cooperates therewith. This support pin system also includes a locking nut retainer having a crimpable split cylindrical wall portion and an axial slot and tabs that extend radially from the wall portion along its external surface. The locking nut retainer is positioned around at least a portion of the locking nut. The guide tube flange has a counter bore having an annular recess radially defined in the wall to accommodate at least the portion of the wall portion of the locking nut retainer which includes the tabs. The tabs are positioned within the annular recess and the locking nut retainer is positively retained in the guide tube flange. The locking nut may further include a crimp receiving section having at least one recess in its external surface, so that a portion of the wall portion of the locking nut retainer crimpingly engages the recess to positively retain the locking nut in position around the support pin and prevent the nut from becoming a loose piece if the support pin breaks in the shank region.

While the support pin system of the '448 patent is a substantial advance in the art, it unfortunately does not overcome all of the problems of the prior art. Although the split intermediate section of the second pin portion has an outer diameter less than the outer diameter of the solid body section so that transverse loads are reacted substantially in pure shear by the second pin portion through the solid body section, the shear stresses under certain emergency operating circumstances may come close to exceeding the yield point for the support pin. Additionally, the use of the locking nut retainer around the locking nut requires a perpendicular relationship between the guide tube flange and the locking nut if unwanted loads are to be avoided. Where these two components are skewed rather than perpendicular, unwanted bending loads are imposed on the shank of the support pin when the locking nut is tightened.

Clearly, there is a need for a supporting pin system in which the stresses in the support pin will not exceed the yield strength of the pin under any type of operating circumstances and in which the locking nut will not impose bending loads on the support pin.

SUMMARY OF THE INVENTION

The present invention is directed to a mounting system for removably mounting the lower flange of a control rod guide tube over an opening in the upper core plate of a nuclear reactor. The mounting system is a non-welded mechanical support pin system using at least one and preferably two or more support pins mounted on the guide tube lower flange and resiliently receivable in a bore formed in the upper core plate. The support pin is elongated and includes first and second pin portions. The first pin portion is disposed within and passes through the through-bore of the guide tube flange and has an externally threaded section. The second pin portion is frictionally secured within the bore of the upper core plate and has a solid body section and a split-leaf base section. The solid body section has outer diameter that is accommodated in the bore by a close clearance fit that limits the loads in the split-leaf base section. The split-leaf base section has a split intermediate section and a split end section. The split intermediate section extends from the solid body section and has an outer diameter which is less than the outer diameter of the solid body section, and the split end section extends from the split intermediate section and biasingly engages at least a portion of the wall of the bore. The split intermediate section is uniformly tapered from a maximum outer diameter adjacent the solid body section to a minimum outer diameter substantially adjacent the split end section to form a conical shape that maintains stresses in the support pin at a substantially constant low level and which increases the flexibility of the support pin. The support pin is secured within the upper core plate bore by a frictional fit and loads applied transversely to the longitudinal axis of the support pin are reacted substantially in pure shear by the second pin portion through the solid body section.

A locking nut threadedly engages an externally threaded section of the first pin portion and cooperates therewith. Additionally, the locking nut may further include a crimp-receiving section having at least one recess in its external surface so that part of the wall portion of the locking nut retainer crimpingly engages the recess to positively retain the locking nut in position around the support pin and prevent relative rotation therebetween. Alternatively, a crimp cap may be formed separately from the locking nut.

In a further modification of the present invention, a washer is disposed around the first pin portion between the locking nut and the control rod guide tube flange. The washer includes a stress reducing shape for eliminating bending moments and stresses on the support pin during the mounting of the locking nut on the first pin portion of the support pin. The stress reduction shape is a concave spherical surface formed on the upper surface of the washer which receives a complementary convex spherical surface formed on the lower surface of the locking nut. The spherical surface is shiftable during mounting of the locking nut to compensate for non-perpendicular alignment between the support pin and the control rod guide tube flange.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF PREFERRED EMBODIMENTS

The present invention provides a support pin system which is a nonwelded mechanical system in which a novel support pin fastens a first structural member to a second structural member. As described herein, the first structural member is a control rod guide tube and the second structural member is an upper core plate of a nuclear reactor. A first pin portion passes through a through bore in the control rod guide tube flange and has a threaded section which mates with a locking nut. A second pin portion has a solid body section and a split-leaf base section, the split-leaf base section frictionally engaging a bore provided in the upper core plate. The solid body section is accommodated by the bore by a close clearance fit. The split-leaf base section has an intermediate section with an outer diameter which is less than the outer diameter of the solid body section. Thus, loads applied transversely to the longitudinal axis of the support pins system are reacted substantially in pure shear through the solid body section of the support pin. By reacting to the transverse loads substantially in this manner, rather than through the bending moment of the leaves of the pin, the bending loads on the pin are substantially reduced and the bending stresses are substantially relieved. Moreover, the intermediate section has a tapering, conical outer diameter to maintain constant the stresses in the split-leaf base section.

A washer is disposed around the first pin portion between the locking nut and the control rod guide tube flange and includes a concave spherical upper surface which is shiftable during mounting of the locking nut to compensate for nonperpendicular alignment between the support pin and the control rod guide tube flange.

The support pin system preferably has a support pin fabricated from a nickel based alloy, most preferably strain-hardened 316 stainless steel which is more resistant to stress corrosion cracking than Inconel-750[1] which also may be used. Such cold worked 316 stainless steel has an excellent operating history in reactor internals applications. The locking nut and spherical washer portions of the support pin system also preferably are formed of cold worked 316 stainless steel. The preferred material for the crimp cap and locking cap are 304 stainless steel.

[1]Inconel is a U.S. registered trademark owned by the International Nickel Corporation.

Figure 1:
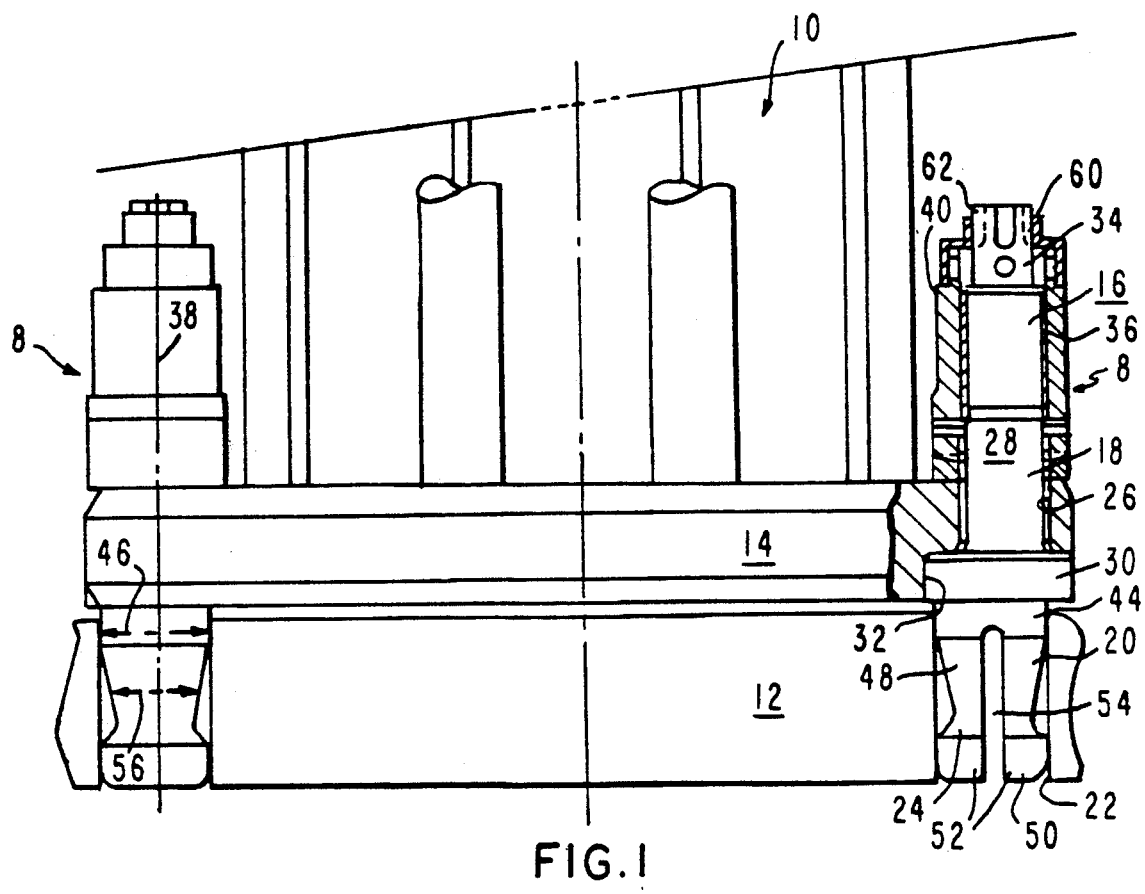
FIG. 1 is a cross-sectional view of a guide tube secured to a core plate with a tapered leaf support pin according to the present invention.
Figure 3:
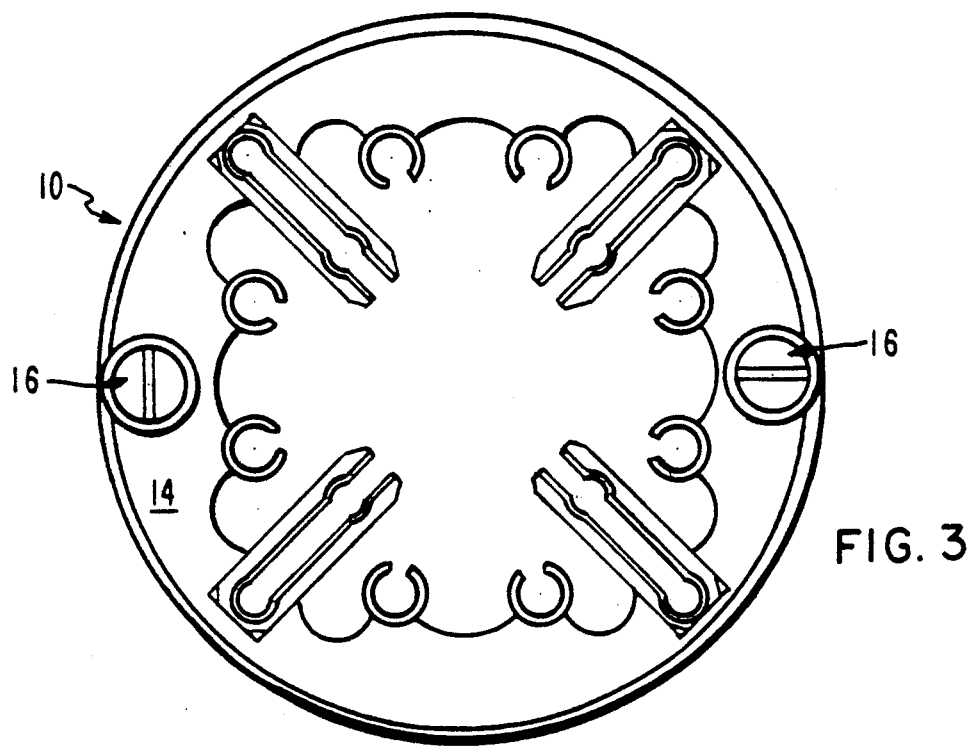
FIG. 3 is a top view of the guide tube showing the location of the tapered leaf support pins.
Figure 2:
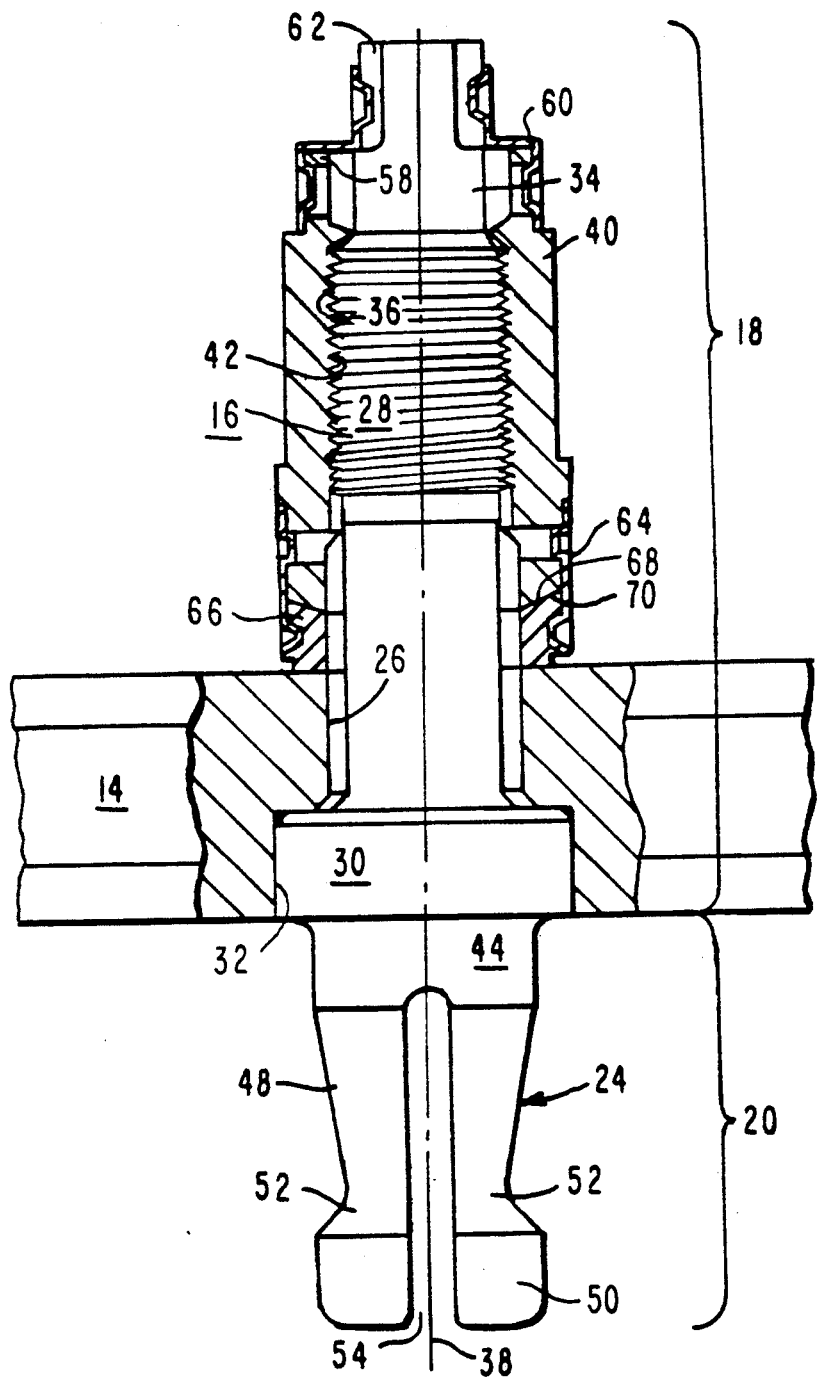
FIG. 2 is a cross-sectional view of the tapered leaf support pin of FIG. 2.
Figure 4:
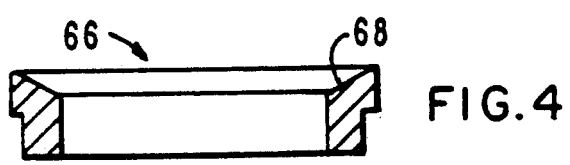
FIG. 4 is a cross-sectional view of a spherical washer used with the tapered leaf support pin.

The invention can be better understood by referring to the Figures and particularly FIGS. 1 and 2 which illustrate elevational side views, partly in cross-section, of a novel, improved support pin system 8 constructed in accordance with the present invention. The cooperative parts of support pin system 8 are shown as being used in a nuclear reactor power plant for securing control rod guide tubes 10 to upper core plate 12. The support pin system 8 may be installed initially or may be retrofitted when an existing conventional guide tube support pin system requires repair or replacement due to failure under, for example, stress corrosion cracking conditions. The vertically positioned control rod guide tubes are secured to upper core plate 12 through annular guide tube flanges 14, one flange 14 being formed around the lower periphery of each guide tube. In order to interconnect guide tube flange 14 to upper core plate 12, a plurality of vertically disposed support pins 16 are used, two such pins 16 being shown substantially in full view in FIG. 1. The support pin orientation here is vertical, although any orientation would be within the scope of the invention. Pins 16 are disposed in a circumferential array within the annular guide tube flange 14, usually in pairs. An upper or first pin portion 18 is disposed within guide tube flange 14 and a lower or second pin portion 20 is disposed within upper core plate 12.

In order to accommodate the disposition of the support pins 16, the upper surface of upper core plate 12 is provided, at locations corresponding to each support pin 16, with a bore 22 within which a lower, split-leaf base section 24 of the support pin is adapted to be frictionally inserted and retained in a biased engagement. Although bore 22 is shown as a through bore, in some applications it may be a blind bore, whereby the split leaves are retained therewithin should they shear. Guide tube flange 14 is provided, at locations corresponding to each support pin 16, with a through bore 26 for accommodating an intermediate shank portion 28 of support pin 16. Shank portion 28 and base section 24 of support pin 16 are integrally connected by an annular shoulder 30. A counter-bore 32 is defined within the lower surface of guide tube flange 14 proximate to upper core plate 12 to be coaxially or concentrically disposed with respect to guide tube flange through bore 26. In this manner, support pin annular shoulder 30 is appropriately accommodated and seated within the lower surface of guide tube flange 14.

First pin portion 18 of support pin 16 has an upper end section 34 and an externally threaded section 36. Upper end section 34 of the support pin 16 projects vertically upwardly and axially outwardly from the guide tube flange through bore 26, along longitudinal axis 38 and is adapted to be threadedly mated with an annular, axially elongated, internally threaded, securing or locking nut 40. Internally threaded section 42 of nut 40 threadedly engages the externally threaded section 36 of support pin 16. Nut 40 fixedly retains guide tube flange 14 in its mounted mode upon each support pin 16, and therefore fixedly secures or fastens flange 14 of nuclear reactor control rod guide tube 10 on upper core plate 12.

Extending downwardly from annular shoulder 30 of first pin portion 18 is a solid body section 44 of second pin portion 20. Solid body portion 44 has a constant outer diameter 46 which is accommodated by core plate bore 22 by a close clearance fit. The split-leaf base section 24 extends from solid body section 44 and has a split intermediate section 48 which extends from solid body section 44 and terminates in a split end section 50. Split end section 50 biasingly engages at least a portion of the wall of core plate bore 22, whereby support pin 16 is fixedly secured within upper core plate 12 by a frictional fit. Split intermediate section 48 includes two leaves 52 which are separated by longitudinal gap 54. As shown in the figures, gap 54 extends into solid body section 44 to increase the flexibility of split intermediate section 48. In an alternative embodiment, gap 54 may terminate without extending into solid body section 44. Split intermediate section 48 has an outer diameter 56 which is less than outer diameter 46 of solid body section 44 so that split intermediate section 48 does not engage the wall of bore 22. Thus, split-leaf base section 24 frictionally engages bore 22 at split end section 50, but not along split intermediate section 48.

As a further improvement over the support pin of the '448 patent, split intermediate section 48 has a varying outer diameter 48 with a preferably uniformly tapered cross section such that outer diameter 48 is a maximum and is substantially equal to outer diameter 46 of solid body section 44 adjacent solid body section 44. Outer diameter 52 decreases along longitudinal axis 38 of support pin 16 in a direction toward split end section 50 of split-leaf base section 24 to a minimum diameter adjacent split end section 50. The varying of outer diameter 52 creates a split intermediate section 48 having a substantially fructroconical shape. Moreover, the tapered leaf design of split intermediate section 48 adds to the flexibility of the support pin and accommodates insertion displacements due to misalignment of the support pin and hole size interferences.

The tapered shape of split intermediate section 48 is designed to develop sufficient preload to prevent fatigue of the leaves 52. The stresses in the leaves are limited by the interference preload and radial clearance between the second pin portion 20 of support pin 16 and the upper core plate bore 22. The present structure minimizes the bending stress on intermediate shank portion 28 by restricting bending of support pin 16 along its length by the close clearance fit provided between solid body section 44 and the walls of core plate bore 22.

Prior art support pins were susceptible to stress cracking corrosion in the crotch portion where the split intermediate section joins the solid body section. Such prior art support pins had solid body sections and split intermediate sections having the same outside diameter so that applied loads reacted in bending as well as in shear and machining tolerances could be more relaxed to accommodate misalignments since the prior art configurations did not provide a close clearance fit. The present support pin 16 accommodates misalignments by increasing the length of second pin portion 20. The present support pin 16 also is preferably provided with a solid body section 44 having an outer diameter 46 which is greater than outer diameter 56 of the intermediate shank portion 28 of the upper or first pin portion 18, for additional strength when loads are reacted in shear therethrough.

Furthermore, by forming split intermediate section 48 of a varying, tapering outer diameter 56 which is never greater than outer diameter 46 of solid body section 44 (and only equals outer diameter 46 at the common connecting plane between solid body section 44 and split intermediate section 48), the stresses in split-leaf base section 24 which reacts to loads in pure shear are reduced. The tapered design holds these stresses at a fairly constant level which is below the yield point of support pin 16. This reduces the chances of failure of the support pin during use.

Preferably, guide tube flange 14 is approximately 2.38 cm thick and upper core plate 22 is approximately 3.81 cm thick, and support pin 16 is advantageously about 12.21 cm in length. Bore 22 provided in upper core plate 12 is a through bore and accommodates second pin portion 20 which has a length of 3.81 cm. Furthermore, the outer diameter of intermediate shank portion 28 is approximately 1.45 cm, the outer diameter of annular shoulder 30 is 2.78 cm, the outer diameter of solid body section 44 is 2.08 cm, the total outer diameter of split intermediate section 48 is less than 2.08 cm, and the total outer diameter of the split end section 50 in its free state is 2.13 cm. The diameter of core plate bore 22 is 2.10 cm such that a close clearance fit exists between core plate bore 22 and solid body section 44, but a much larger clearance exists between split intermediate section 48 and core plate bore 22.

The locking system for support pin system 8 includes locking nut 40 having an internally threaded section 42 and a crimpable cylindrical section 58 extending from and integrally connected to internally threaded section 42. Alternatively, and as shown in the figures, the crimpable cylindrical section may be separate from locking nut 40 and may be formed on a separate crimp cap 60. Internally threaded section 42 threadedly engages externally threaded section 36 of first pin portion 18 of support pin 16. Threaded sections 42, 36 cooperate to retain guide tube flange 14 between locking nut 40 and annular shoulder 30. Guide tube flange 14 should be retained between locking nut 40 and solid body section 44 of second pin portion 20 of the support pin 16.

Once locking nut 40 has been threadedly engaged upon threaded section 36 of support pin 16 and appropriately torqued to a predetermined load limit or value, it is desirable to insure that the pin and nut assembly remains intact in its assembled state to insure that guide tube flange 14, and therefore nuclear reactor control rod guide tube 10, remains positionally fixed with respect to nuclear reactor upper core plate 12. As seen in FIG. 2, upper end section 34 of support pin 16 above threaded section 36 is provided with a plurality of recesses 62, which are shown in as longitudinally or axially extending recesses 62 equiangularly spaced around support pin 16 at 90° intervals and which serve as crimp receiving sections or grooves. For some modifications, the recesses need not be longitudinal, although longitudinal recesses are preferred. Upper end section 34 of support pin 16 passes through the coaxially aligned crimpable cylindrical section 58 of crimp cap 60, and once the crimp cap, locking nut, and support pin assembly is fully threadedly engaged and the predetermined torque load value or limit has been attained, crimps (not shown) are made by pressing upon and deforming portions of crimpable cylindrical section 58 into crimp receiving sections or longitudinal recesses 62 of support pin 16 as explained in the '448 patent. In practice, diametrically opposed crimps are formed by simultaneously pressing from opposite directions to operatively engage two diametrically opposed longitudinal recesses 62 formed upon upper end section 34 of support pin 16. This crimping operation must be performed at the location sites of the support pins 16, and must be performed by suitable, remotely controlled tools (not shown), whereby such crimping operations may be performed in an irradiated underwater environment without exposing maintenance personnel to the irradiated environment when support pin system 8 is retrofitted in an operating nuclear reactor.

Spacial restrictions frequently do not permit use of an hexagonal nut since a hexagonal torque wrench cannot be positioned around the nut structure in an annular 360° mode to impart the necessary torque to the securing nut. Accordingly, locking nut 40 is a spline nut and is provided with vertically oriented splines (not shown) disposed within the external surface in a circumferential array and alternatingly associated with adjacent spline grooves. In this manner, a suitable splined torque tool (not shown), can axially engage and apply rotational torque to the locked nut splines 66. Due to the spacial constraints and restrictions of the use environment, the splined torquing tool need not engage locking nut 40 in a complete 360° annular relationship as is required with a conventional external hexagonal torque wrench. The external splined torque wrench may engage the locking nut splines over a circumferentially extending arcuate area of less than 180°, and the splined torque wrench stroke may be 36°.

The locking system for support pin system 8 also includes improvements over the support pin of the '448 patent. Disposed around intermediate shank portion 28 of first pin portion 18 below externally threaded section 36, between locking nut 40 and the upper surface of guide tube flange 14, are lock cup 64 and spherical washer 66. Spherical washer 66 includes a concave spherical upper surface 68 which serves as a stress reduction mechanism during mounting of locking nut 40 on first pin portion 18 during installation of support pin system 8 to guide tube flange 14 and upper core plate 12. The lower surface of locking nut 40 is formed with a complementarily-shaped convex spherical surface 70 which mates with spherical washer 66. Concave spherical upper surface 68 is shiftable during mounting of locking nut 40 to accommodate and compensate for a nonperpendicular alignment between either support pin 16 or locking nut 40 and guide tube flange 14. This virtually eliminates bending in intermediate shank portion 28 of support pin 16 during installation and eliminates any requirement of performing costly machining operations to machine a flat clamping surface during support pin replacement in operating plants. In operation, where guide tube flange bore 26 is not perfectly perpendicularly formed in guide tube flange 14, intermediate shank portion 28 of support pin 16 is tilted at a nonperpendicular angle relative the top of the flange. Upon installation, locking nut 40 would first contact an edge of the flange and try to flatten out to rest flat against the flange. This would bend the intermediate shank portion of the support pin. However, use of spherical washer 66 permits locking nut 40 to align in a nonperpendicular orientation relative guide tube flange 14 without imparting bending forces to intermediate shank portion 28, because locking nut 40 may rotate relative to spherical washer 66 so that the relative spherical portions matingly engage each other.

Lock cup 64 serves to hold spherical washer 66 and locking nut 40 together as a unit to prevent separation during shipping. Lock cup 64 serves a similar purpose during and after installation and the lock cup is rotatable relative spherical washer 66 due to the clearance therebetween.

We claim:

1. An elongated guide tube support pin for removably mounting a lower flange of a control rod guide tube to a core plate having a bore, wherein a variable shear load is applied to said guide tube relative to said core plate, comprising:
   a first pin portion mountable on the lower flange of the guide tube; and
   a second pin portion receivable within the bore of the core plate and frictionally engageable therein, said second pin portion having a split leaf section including an upper portion and a lower portion whose outer diameter is substantially the same as the inner diameter of the bore, and a split intermediate section having a tapered outer diameter for causing stresses in said split leaf section to be substantially uniform wherever a shear load is applied to the support pin.

2. The support pin according to claim 1, wherein said split intermediate section has a maximum diameter at its end adjacent said upper portion and a minimum diameter at its opposite end adjacent to said lower portion.

3. The support pin according to claim 1, wherein said upper portion of said second pin portion includes a solid body section between said first pin portion and said split leaf section and having an outer diameter which is accommodated by the bore by a close clearance fit, said split intermediate section outer diameter is less than the outer diameter of said solid body section, and said lower portion of said split leaf section further includes a split end section extending from said split intermediate section and biasingly engaging at least a portion of the wall of the bore to secure said support pin therein by a frictional fit, and wherein shear loads applied transversely to said longitudinal axis of said support pin are reacted to substantially in pure shear by said second pin portion substantially through said solid body section.

4. A mounting system for removably mounting a lower flange of a control rod guide tube over an opening in an upper core plate of a nuclear reactor comprising at least one elongated support pin mountable on the guide tube lower flange and resiliently receivable in a bore formed in the upper core plate, wherein said support pin has a longitudinal axis and comprises:
   a first pin portion mountable on the guide tube lower flange; and
   a second pin portion resiliently receivable within said upper core plate bore, said second pin portion including a solid body section adjacent said first pin portion and having an outer diameter which is accommodated by said bore by a close clearance fit, and a split leaf section including a split intermediate section extending from said solid body section and having an outer diameter less than the outer diameter of said solid body section and a split end section extending from said split intermediate section and having a portion that biasingly engages at least a portion of the wall of said bore, said split intermediate section being tapered from a maximum outer diameter adjacent said solid body section to a minimum outer diameter substantially adjacent said split end section such that said support pin is secured within said upper core plate by a fictional fit
   wherein loads applied transversely to said longitudinal axis of said support pin are reacted to substantially in pure shear by said second pin portion substantially through said solid body section, and wherein the tapered varying outer diameter of said split intermediate section causes the stress through said split leaf section to be substantially constant.

5. The mounting system according to claim 4, wherein said mounting system further comprises a plurality of support pins for mounting the lower flange of a control rod guide tube over an opening in the upper core plate of a nuclear reactor.

6. The mounting system according to claim 4, wherein said lower flange of said control rod guide tube is formed with a through-bore and said first pin portion of said support pin is receivable within said through-bore.

7. The mounting system according to claim 4, further comprising locking means for retaining the guide tube lower flange between said solid body section of said second pin portion and said locking means.

8. The mounting system according to claim 7, wherein said first pin portion of said support pin includes and externally threaded section and wherein said locking means includes an internally threaded section which threadedly engages said externally threaded section of said first pin portion.

9. The mounting system according to claim 8, wherein said locking means further includes a locking nut having side walls and said locking nut comprises a crimpable cylindrical section integrally connected to said internally threaded section and extending from the outermost portion of said internally threaded portion.

10. The mounting system according to claim 9, wherein said first pin portion further includes an end section remotely positioned from said second pin portion adjacent said externally threaded section and having a plurality of recesses formed on the external surface, and wherein said crimpable cylindrical section of said locking nut is crimpingly engageable with at least one of said plurality of recesses of said support pin to prevent relative rotation between said locking nut and said support pin.

11. The mounting system according to claim 8, wherein said locking means includes a locking nut having side walls, said first pin portion further includes an end section remotely positioned from said second pin portion adjacent said externally threaded section and having a plurality of recesses formed on the external surface, and said mounting system further comprises crimping means for engaging at least one of said plurality of recesses of said support pin to prevent relative rotation between said locking nut and said support pin.

12. The mounting system according to claim 11, wherein said crimping means includes a crimp cap mounted on said end section of said support pin.

13. The mounting system according to claim 4, wherein said split intermediate section is uniformly tapered such that said split intermediate section is conical.

14. The mounting system according to claim 13, wherein said split intermediate section has a shape that maintains stresses in said support pin below the yield point of said support pin.

15. The mounting system according to claim 13, wherein said split intermediate section includes a plurality of leaves separated by a longitudinal gap, wherein said longitudinal gap extends into said solid body section to increase the flexibility of said support pin.

16. The mounting system according to claim 8, further comprising a washer disposed around said first pin portion between said locking means and the control rod guide tube flange.

17. The mounting system according to claim 16, wherein said washer includes stress reduction means for eliminating bending moments and stresses on said support pin during mounting of said locking means on said first pin portion of said support pin.

18. The mounting system according to claim 17, wherein said stress reduction means includes a concave spherical surface formed on the upper surface of said washer, said spherical surface being shiftable during mounting of said locking means to compensate for nonperpendicular alignment between said support pin and the control rod guide tube flange.

19. A support pin system for removably mounting a first structural member to a second structural member having a bore, said support pin system comprising:
at least one support pin comprising a first pin portion mountable on the first structural member, and a second pin portion receivable within the bore;
locking means mounted on said support pin for retaining the first structural member against the second structural member; and
stress reduction means including a washer disposed around said support pin between said locking means and the first structure member, wherein said washer and said locking means include mutually engaging, rounded surfaces for eliminating bending moments and stresses on said support pin during mounting of said locking means on said support pin.

20. The support pin system according to claim 19 wherein said support pin has a longitudinal axis and includes a first pin portion mounted to the first structural member and a second pin portion secured within the bore, said second pin portion having a solid body section adjacent said first pin portion and having an outer diameter which is accommodated by the bore by a close clearance fit and a split leaf section including a split intermediate section extending from said solid body section and having a tapered outer diameter less than the outer diameter of said solid body section and a split end section extending from said split intermediate section and biasingly engaging at least a portion of the wall of the bore, wherein said tapered shape of said split intermediate section lowers stresses in said split leaf section.

21. A mounting system for removably mounting the lower flange of a control rod guide tube over an opening in the upper core plate of a nuclear reactor comprising at least one elongated support pin mounted on the guide tube lower flange and resiliently receivable in a bore formed in the upper core plate, wherein said mounting system comprises:
a support pin having a longitudinal axis and comprising a first pin portion mountable on the guide tube lower flange, and a second pin portion receivable within said upper core plate bore, said second pin portion including a solid body section adjacent said first pin portion and having an outer diameter which is accommodated by said bore by a close clearance fit, and a split leaf section including a split intermediate section extending from said solid body section and having a tapered outer diameter less than the outer diameter of said solid body section for reducing stress in said split leaf section, and a split end section extending from said split intermediate section and biasingly engaging at least a portion of the wall of said bore;
locking means mounted on said first pin portion of said support pin for retaining the guide tube lower flange between said solid body section of said second pin portion and said locking means; and
a washer disposed around said first pin portion between said locking means and the control rod guide tube flange, said washer and said locking means including mutually engaging rounded surfaces for eliminating bending moments and stresses on said support pin during mounting of said locking means on said first pin portion of said support pin.

22. An elongated support pin for removably mounting a first structural member to a second structural member having a bore, wherein a variable shear load is applied to said first structural member relative to said second structural member, comprising:
a first pin portion mountable on the first structural member; and
a second pin portion receivable within the bore and frictionally engageable therein, said second pin portion having a split leaf section inclining an upper portion and a lower portion whose outer diameter is substantially the same as the inner diameter of the bore, and a split intermediate section having a tapered outer diameter for causing stresses in said split leaf section to be substantially uniform wherever a shear load is applied to the support pin,
wherein said upper portion of said second pin portion includes a solid body section between said first pin portion and said split leaf section and having an outer diameter which is accommodated by the bore by a close clearance fit, said split intermediate section outer diameter is less than the outer diameter of said solid body section, and said lower portion of said split leaf section further includes a split end section extending from said split intermediate section and biasingly engaging at least a portion of the wall of the bore to secure said support pin therein by a frictional fit, and wherein shear loads applied transversely to said longitudinal axis of said support pin are secured to substantially in pure shear by said second pin portion substantially through said solid body section.

* * * * *